United States Patent [19] [11] 3,887,956
Wind [45] June 10, 1975

[54] WINDSHIELD WIPER FLUID DISPENSER
[75] Inventor: Harold Wind, Kentwood, Mich.
[73] Assignee: Lescoa, Inc., Grand Rapids, Mich.
[22] Filed: Oct. 18, 1973
[21] Appl. No.: 407,527

[52] U.S. Cl. .......................................... 15/250.04;
[51] Int. Cl. ......... B60s 1/46; B60s 1/48; B60s 1/52
[58] Field of Search ..................... 15/250.01-250.07

[56] References Cited
UNITED STATES PATENTS

| | | | |
|---|---|---|---|
| 2,268,253 | 12/1941 | Hill et al. | 15/250.04 |
| 2,336,007 | 12/1943 | Fuller | 15/250.04 |
| 2,348,502 | 5/1944 | Smulski | 15/250.04 |
| 2,354,440 | 7/1944 | Brown | 15/250.04 |
| 2,748,416 | 6/1956 | Benoit | 15/250.04 |
| 2,925,617 | 2/1960 | Williams | 15/250.04 |
| 3,427,675 | 2/1969 | Tibbet | 15/250.04 |

FOREIGN PATENTS OR APPLICATIONS

| | | | |
|---|---|---|---|
| 1,295,138 | 4/1962 | France | 15/250.04 |

Primary Examiner—Peter Feldman
Attorney, Agent, or Firm—Price, Heneveld, Huizenga & Cooper

[57] ABSTRACT

The windshield wiper arm is connected to a die-cast head which is removably anchored to the crank shaft, the latter being driven by a crank arm for oscillatory movement of the wiper arm and attached wiper blade. At least a portion of the wiper arm is U-shaped opening downwardly and windshield cleaning fluid is dispensed directly onto the windshield beneath the blade through a nozzle mounted near the outer end of the arm portion. Fluid is directed from a source to the nozzle through a conduit formed by a series of passageways including an axial passageway through the crank shaft, a second passageway formed through the die cast head, a third passageway in the form of a tube extending from the die cast head to the nozzle completely shielded beneath the top of the wiper arm portion, and a fourth passageway in the form of a tube leading from the source of fluid to the inlet end of the shaft.

10 Claims, 2 Drawing Figures

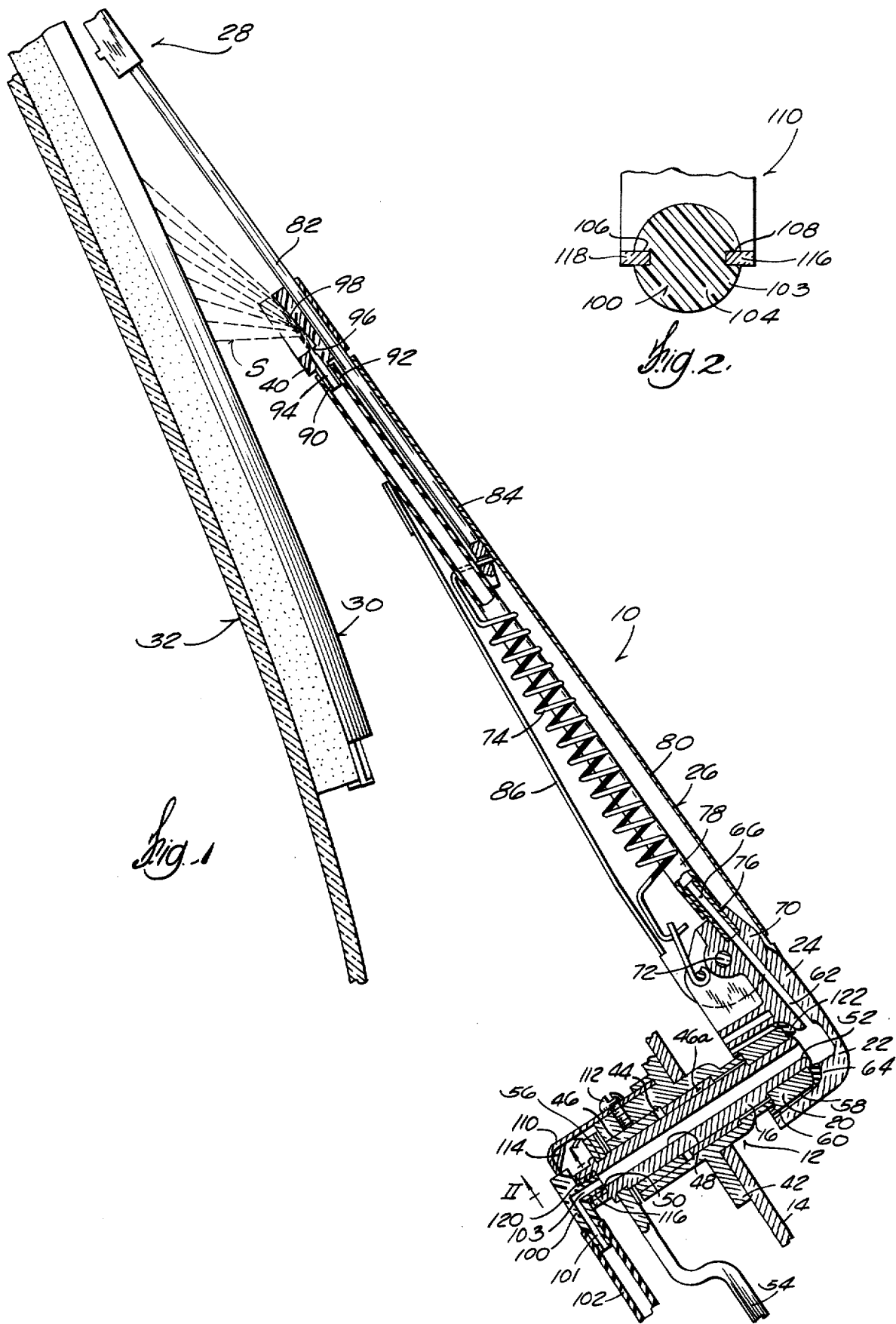

WINDSHIELD WIPER FLUID DISPENSER

BACKGROUND OF THE INVENTION

This invention relates to vehicular windshield wiper assemblies and more particulary to a novel means for dispensing cleaning fluid through the wiper assembly.

The conventional means for dispensing fluid onto a windshield for cleaning same is to provide one or more nozzles near the termination of the automobile cowling through which fluid is pumped under pressure to spray over the windshield. A principal disadvantage of this type of arrangement is that the projection of fluids over the windshield is not maintained properly at high vehicle speeds. The air flow developed over the windshield as a result of high vehicle speeds disrupts the distribution of the fluid in many cases preventing it from ever even touching the windshield. At best, not enough is spread in the proper place which is where the wiper blade is moving. A second disadvantage is the exposure of the nozzle which is in many cases damaged as a result of manual cleaning of the windshield. Also, corrosion readily takes its toll since the nozzle is exposed directly to the elements which problem becomes extremely critical in the winter time when the nozzle is exposed to salts and grime developed from winter driving conditions.

The prior art has developed attempts to overcome some of these disadvantages by placing the dispensing fluids in closer proximity to the blade engagement with the windshield. These proposals have to date however been unsatisfactory in that the structures proposed have been quite complex and therefore costly which is a great determent to utilization in a highly competitive industry such as the automotive industry. The proposals that Applicant is aware of have concentrated on attempting to provide passageways within the wiper blades themselves with openings or other means for providing an outlet for the fluid so that the water is directly dispensed through the blade onto the windshield. Due to the resiliency and compressibility of the wiper blade however these passageways can become blocked thereby preventing all dispensing of fluids and the associated costs of such blades make them competitively disadvantageous. None of the proposals known to Applicant taught by the prior art have completely shielded the entire passageway and nozzle to eliminate inadvertent damage by persons working in and around the wiper blade such as a gas station attendant who generally administers manual cleaning to the windshield. Thus, there is a need in this art for an improved windshield wiper cleaning fluid dispenser arrangement which provides fluid dispensing onto the windshield directly at the point of discharge and at all times directly at the locus of engagement between the blade and windshield.

SUMMARY OF THE INVENTION

The conventional windshield wiper assembly includes a base anchored to the cowling of a vehicle with a drive shaft rotatably secured in the base for oscillatory rotation about its longitudinal axis. The shaft includes an upper portion extending above the base which receives a head member rotatable therewith, the head member having a radial portion extending radially relative the rotational axis. The wiper arm is anchored at one end to the radial portion with a wiper blade being pivotally connected near its center to the other end of the wiper arm.

In accordance with the invention, a novel windshield cleaning fluid dispensing means is provided which comprises a first passageway formed in the shaft lengthwise therethrough which communicates with a second passageway formed in the head member, which communicates through a flow tube with a nozzle anchored to the wiper arm near its outer end for dispensing fluids directly onto the windshield beneath the blade. This provides fluid directly beneath the blade at all times regardless of its position as it moves across the windshield.

In narrower aspects of the invention, the head member base and shaft are die-cast and appropriate seals are positioned between the interconnection of the head member passageway to the shaft passageway as well as the inlet to the shaft passageway with the tube leading from the source. A blind T-fitting is utilized to interconnect the tube from the source to the shaft inlet. Preferably, a downwardly opening U-shaped blade arm is utilized such that the tube leading from the head member to the nozzle is completely shielded from the external with all other portions of the dispensing conduits being within the wiper arm assembly and therefore completely shielded also.

The advantages of the windshield wiper fluid dispenser in accordance with the invention are many-fold. To begin with, the entire fluid dispensing system is shielded from inadvertent damage which feature also greatly inhibits deterioration through corrosion or the like through exposure to the elements. Thus, the entire arrangement is essentially maintenance-free. An additional advantage is that it provides the dispensing of fluid directly at the location most desired and yet is not particularly complex. It does not require any modification of the conventional wiper arm and blade. The flow passageway is not formed within the arm or blade and therefore these conventional parts need not be modified. The provision of a die-cast base and head member is economically attractive and formation of the passageways simultaneously therein reduces the amount of passageway which can be inadvertently blocked or damaged through assembly or subsequent maintenance of the vehicle itself.

DESCRIPTION OF THE DRAWING

FIG. 1 is a fragmentary side elevation view of a portion of the wiper blade assembly in accordance with the invention, portions being in cross section; and FIG. 2 is an enlarged view in cross section taken along line II of FIG. 1.

DESCRIPTION OF THE PREFERRED EMBODIMENT

Referring now to FIG. 1 in detail, a wiper blade assembly 10 is shown comprising a base 12 anchored to the cowling 14 of an automobile (not shown). A crank shaft 16 is rotatably mounted within base 14 and has an upper end extending beyond the cowling to which a driver 20 is staked. A head member 22 fits over driver 20 and is reciprocally rotated with the crank shaft 16. Head member 22 includes a radial portion 24 extending generally radially with respect to the axis of crank shaft 16 and has a wiper arm 26 attached at one end to radial portion 24. The opposite free end 28 of arm 26 releaseably receives blade assembly 30 in a conventional fashion. The details of this attachment or of the blade are thus not described in great detail. Blade assembly 30 is shown in engagement with a windshield 32.

A nozzle 40 is anchored to blade arm 26 and directed for dispensing windshield cleaning fluid from a source (not shown) in the form of a spray "S" directly onto the windshield in close proximity to the blade regardless of its particular position relative the windshield as it traverses windshield 32. The conduit means interconnecting the source with nozzle 40 is comprised of a passageway 48 through shaft 16; a second passageway 62 through head member 22; a third passageway 78 interconnecting head member 22 with nozzle 40 and a fourth passageway 102 interconnecting the source (not shown) of cleaning fluid with shaft 16. The details of the conduit means will now be described.

Referring in more detail to FIG. 1, shaft 16 is rotatably mounted within base 12 by a pair of bearing members 46, 46a the shaft being positioned within space 12 by crank arm 54 which provides the reciprocating rotational movement of shaft 16 which crank arm is attached to shaft 16 within attachment groove 56. Passageway 48 formed through shaft 16 includes a flow inlet 50 and flow outlet 52. Crank arm 54 is secured at the inlet end. A drive member 20 is anchored or staked to the outlet end of shaft 16 for mesh engagement with the inner sides of an opening 60 formed within head member 22. The outer periphery of driver 20 includes a plurality of axially extending circumferentially spaced serrations 58 which glove with mating serrations within inner wall of opening 60. In this fashion, head member 22 is removably anchored to shaft 16 for joint reciprocal rotation therewith.

Opening 60 forms in part a passageway 62 which has a considerably reduced cross section reltaive opening 60 and includes a radially extending portion 66. Portion 66 extends essentially radially with respect to the axis of shaft 16. The flow of cleaning fluid through passageway 48 is thus directed in a direction approximately perpendicular to shaft 16 through passageway 62. From there flow is directed through a tube 78 which interconnects passageway 62 with nozzle 40. Tube 78 may be flexible or rigid and comprised of a metal or plastic. Preferably, it is interconnected to passageway 62 by a rubber fitting 76 which allows lateral movement of tube 78 relative head member 22.

Head member 22 includes a rotatable portion 70 which permits pivotal movement of arm 26 about an axis perpendicular to the axis of rotating shaft 16. This permits the blade arm and associated blade to adjust smoothly over the curvature of the windshield. It also permits manual rotation for cleaning purposes and/or changing of the blade. During operation, the pivotal adjustment about shaft 72 will not interrupt flow through passageway 62. Wiper blade 26 is constantly urged for tight engagement against windshield 32 by spring 86.

One aspect of the invention is to completely shield the conduit means from external exposure and in this regard, blade arm 26 preferably includes at least a portion having a top 84 and a pair of depending sides extending from top 84, one side 86 of which is shown in FIG. 1. Preferably this portion extends to nozzle 40 and as illustrated in a conventional wiper arm, a second portion 82 in the form of a rectangular rod-like member extends beyond housing portion 80, the opposite end being attached to blade 30.

Nozzle 40 has an axial projecting portion of reduced cross section which fits snugly within tube 78 to connect nozzle 40 to tube 78. Nozzle 40 is also preferably anchored to blade arm 26. The nozzle includes a passageway portion 94 reduced to a constricted orifice 96. Flow through the conduit means is forced out orifice 96 under increased pressure to produce a spray effect. Nozzle 40 also includes a deflection face 98 causing the fluid dispensed therethrough to form a spray S of some latitude to cover a substantial portion of the windshield immediately beneath blade 30. It will be appreciated that nozzle 40 is in close proximity to blade 30 and that due to the normal movement of blade 30 relative arm 26, the lower portion of blade 30 illustrated in the drawings will always be slightly offset behind the directional movement of blade 26. In this regard, the spray S is directed relatively close to the windshield but just in front of blade 30 so that maximum application and cleaning is achieved regardless of the position of arm 26 and blade 30 as it traverses the windshield.

A blind T-fitting 100 interconnects passageway 102 with the inlet 50 of drive shaft 16. The fitting includes a passageway formed theretherough forming a general L-shape with one branch 101 snugly fitting within tube 102 and the other branch 103 fitting within the inlet opening portion 50 of shaft 16. Since shaft 16 rotates reciprocally, a sealing means is provided at both the inlet and outlet ends of shaft 16 to prevent leakage at either end. At the inlet end, a seal material 120 is provided between branch 103 and the wall of inlet opening 50 while at the outlet end 52, an O-ring type seal is wedged between the inwardly curving ceiling portion 64 of opening 60 and the upper face portion of driver 20.

Blind T-fitting 100 is anchored into position by a clip 110. With reference to FIG. 2, the blind portion 103 of fitting 100 includes a pair of diametrically spaced grooves 106 and 108 formed longitudinally along the outer surface of blind portion 103 for receipt of two finger portions 116 and 118 of clip 110. Clip 110 has a general L-shape with one leg being anchored to base 12 by a fastener 112 with the other leg being formed into the two finger portions 116 and 118. A dart 114 may be utilized to strengthen clip 110.

With regard to fitting 100, the inlet portion thereof in wedged engagement with tube 102 is preferably saw toothed (not shown) to prevent inadvertent removal therefrom and leakage. The blind T-fitting 100 preferably does not rotate with shaft 16 but is anchored to base 12 as described.

Having described the unique conduit means of the invention, it will be appreciated that the overall operation and arrangement is advantageous in that the entire distribution means for discharging fluid directly in front of blade 30 is completely shielded and not externally exposed thereby greatly enhancing its service life since it is not subject to inadvertent damage. It is also essentially maintenance free and not subject to as great exposure to the elements which are particularly severe in winter time.

The blind T-fitting is preferably plastic while base 12, drive shaft 16, driver 20 and head member 22 are preferably die cast. The respective passageways formed therein are formed in the casting process. The connector 76 as described previously is preferably rubber or some other type of flexible material. Since tube 78 is subjected to the elements even though of diminished nature, it is preferably metal while nozzle 40 which provides the spray jet is preferably plastic. It will be appreciated that the direction of hose or tube 102 relative the inlet opening 50 is optional and hence a connector fitting 100 of different configuration can be utilized. Preferably the connector fitting is anchored to the base or cowling.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

What is claimed is:

1. In a windshield wiper assembly having a base adapted to be anchored to the cowling of a vehicle; a drive shaft rotatably secured in said base for oscillatory rotation about its axis, said shaft having an upper portion adapted to extend above the base beyond the cowling; a head member removably anchored to the upper end of said shaft and rotatable therewith, said head member having a radial portion extending radially relative said axis, a wiper arm anchored at one end to said radial portion; a wiper blade pivotally connected near its center to the other end of said wiper arm; a source of windshield cleaning fluid; and conduit means for dispensing windshield cleaning fluid from said source on the associated windshield of the vehicle, the improvement comprising: said conduit means comprising a first passageway formed in said shaft lengthwise therethrough and having an inlet and an outlet; a second passageway formed in said head member and likewise having an inlet and an outlet, the outlet of said second passageway being at the end of said radial portion in a general radial direction relative to said axis, the inlet of said second passageway communicating with the outlet of said first passageway; a nozzle anchored to said arm for dispensing cleaning fluid directly onto the associated windshield in close proximity of said blade, said fluid being dispensed at all times directly beneath said blade regardless of the location of said blade on said associated windshield; a third passageway interconnecting the outlet of said second passageway with said nozzle; said third passageway being completely shielded beneath said wiper arm; a fourth passageway interconnecting said source of fluid with the inlet of said first passageway, said fourth passageway having an outlet communicating with said first passageway inlet and a fitting interconnecting said first and fourth passageways together, said fitting being anchored into proper position by a clip means which prevents rotation of said fitting jointly with said shaft.

2. The improvement according to claim 1 wherein said fitting has an L-shaped passageway, one leg of which fits snugly within the inlet of said first passageway, the other leg of which fits snugly within the outlet of said fourth passageway.

3. The improvement according to claim 1 wherein said conduit means further includes a sealing means intermediate said first passageway inlet and fitting.

4. The improvement according to claim 1 wherein said clip means is secured to said base and fitting, said fitting including at least one groove formed along the outer surface and said clip means including a portion forming a tongue and groove fit therewith to anchor said fitting relative said shaft.

5. A windshield wiper assembly comprising, in combination: a base for anchoring to the cowling of a vehicle; and drive shaft rotatable in said base; a one-piece integrally formed head member removably anchored to said shaft and rotatable therewith, said head member having a shaft engaging portion and a portion extending radially relative said shaft; a wiper arm attached at one end to said radial portion of said head member; a wiper blade pivotally connected near its center to the other end of said wiper arm; a fluid dispersing nozzle anchored to the underside of said wiper arm near said other end; and condiut means for conveying cleaning fluid to said nozzle from a source comprising a first passageway formed centrally through said shaft, an enlarged central opening in said shaft engaging portion of said head member which communicates with said first passageway when said head member is positioned on said shaft, a second passageway formed centrally through said radial portion of said head member communicating directly with said enlarged opening, and a tubular hose means interconnected between said nozzle and said radial head portion anchored to the underside of said wiper arm.

6. The improvement according to claim 5 wherein said conduit means includes a sealing means positioned in said enlarged opening in sealing engagement between said drive shaft and head member.

7. The improvement according to claim 6 wherein said enlarged central opening includes an upper ceiling portion, said drive shaft including a driver attached thereto which forms a tight fit with said head member opening, said sealing means being disposed intermediate said ceiling portion and drive.

8. The improvement according to claim 1 wherein the outlet portion of said head member is rotatable relative the remainder thereof, said conduit means including a rubber connector connecting the outlet of said second passageway with the inlet of said third passageway.

9. The improvement according to claim 1 wherein said nozzle includes a constricted discharge orifice which disperses the fluid under pressure, said nozzle further including a sloped face which causes particle break-up whereby a spray is developed providing fluid dispersement onto said windshield along a substantial portion in close proximity of said blade.

10. The assembly according to claim 5 wherein said nozzle includes an impact surface sloped relative the direction of fluid discharge to cause fluid particle break-up as the fluid is dispensed over the windshield.

* * * * *